(12) United States Patent
Spencer

(10) Patent No.: US 9,189,971 B2
(45) Date of Patent: Nov. 17, 2015

(54) JURY SELECTION SYSTEM

(71) Applicant: Kenneth Spencer, Pacific Palisades, CA (US)

(72) Inventor: Kenneth Spencer, Pacific Palisades, CA (US)

(*) Notice: Subject to any disclaimer, the term of this patent is extended or adjusted under 35 U.S.C. 154(b) by 176 days.

(21) Appl. No.: 13/963,892

(22) Filed: Aug. 9, 2013

(65) Prior Publication Data

US 2014/0045155 A1 Feb. 13, 2014

Related U.S. Application Data

(60) Provisional application No. 61/742,446, filed on Aug. 10, 2012, provisional application No. 61/796,401, filed on Nov. 10, 2012.

(51) Int. Cl.
*G06Q 50/00* (2012.01)
*G09B 19/00* (2006.01)
*G06Q 50/18* (2012.01)

(52) U.S. Cl.
CPC ............... *G09B 19/00* (2013.01); *G06Q 50/18* (2013.01)

(58) Field of Classification Search
None
See application file for complete search history.

(56) References Cited

U.S. PATENT DOCUMENTS

| | | | | |
|---|---|---|---|---|
| 1,788,715 A | * | 1/1931 | Hall | 434/431 |
| 2,498,854 A | * | 2/1950 | Hazel | 434/235 |
| 2,867,045 A | * | 1/1959 | Millgate | 434/426 |
| 4,010,553 A | * | 3/1977 | Bennett | 434/338 |
| 4,055,381 A | | 10/1977 | Lauer et al. | |
| 4,919,259 A | * | 4/1990 | Beaulieu | 206/45.2 |
| 5,215,398 A | | 6/1993 | White et al. | |
| 5,752,589 A | * | 5/1998 | Berg | 190/109 |
| 6,135,662 A | | 10/2000 | Bakket et al. | |
| 2005/0149567 A1 | | 7/2005 | Levin et al. | |
| 2010/0058627 A1 | * | 3/2010 | Helmich et al. | 40/124.4 |
| 2010/0235217 A1 | | 9/2010 | Ehlert et al. | |

FOREIGN PATENT DOCUMENTS

| | | |
|---|---|---|
| JP | 2004255734 | 9/2004 |
| JP | 2005343095 | 12/2005 |
| JP | 3823894 | 9/2006 |

OTHER PUBLICATIONS

Shaun Khojayan, Esq., Jury Selection Pro, The Ultimate Tool in Jury Selection, website printout, 2 pages, www.juryselectionpro.com, 2011.
Of First Impressions, New Products for Attorneys: Organization for Jury Selection, 77 ABA Journal, Apr. 1991, p. 129.

* cited by examiner

*Primary Examiner* — Kristina Junge

(57) ABSTRACT

A jury selection system for efficient jury selection using a jury board demarcated with a grid that mimics a jury seating arrangement. The jury selection system further comprises a primary tag to record a juror's information to be placed in the demarcated space on the board that corresponds with the juror's actual seat number. The primary tag has a primary tag indicator to indicate that the tag is a primary tag. A supplemental tag is provided if more information is recorded to be placed on top of the primary tag. The supplemental tag has a cut out to align with the primary tag indicator so that the primary tag can be identified when the supplemental tag is placed on top of the primary tag. Peremptory tags may be used to keep track of peremptory challenges.

3 Claims, 7 Drawing Sheets

JURY SELECTION SYSTEM

CROSS-REFERENCE TO RELATED APPLICATION

This patent application claims the benefit of U.S. Provisional Patent Application Ser. No. 61/742,446. entitled "Jury Selection Notebook," filed Aug. 10, 2012, and U.S. Provisional Patent Application Ser. No. 61/796,401, entitled "Portfolio Case with a Jury Board and Movable Pieces to Assist in the Jury Selection Process," filed Nov. 10, 2012, which applications are incorporated in their entirety here by this reference.

TECHNICAL FIELD

This invention relates to a jury selection system.

BACKGROUND

The legal system has been set up so that peers can determine the outcome of a dispute. These peers are supposed to form an impartial jury panel. However, due to the natural biases and life circumstances of people, one party may not necessarily receive a fair trial if the first 12 jurors were automatically seated without question. Therefore, the jury selection process is an important process is determining the fairness of the trial and maintaining impartiality of the jury.

During the jury selection process, counsel for both sides are allowed to ask each individual juror questions to determine the impartiality of the juror and the juror's ability to appropriately apply the laws to the facts of the case. This process is customarily referred to as "Voir Dire" which has a French origin and means "to speak the truth." This process requires the attorneys and their staff to keep track of questions, answers, and their assessment of each prospect of juror. Oftentimes, notes are scribbled and passed around amongst a number of people. Notes on one juror can get mixed up with notes for another juror, or the notes can simply get lost. Watching an attorney fumble around with his notes can have a negative impact on the jurors as well as the client.

For the foregoing reasons there is a need for a jury selection system that allows the attorneys keep an organized record of the questions asked, the answers provided, and the assessment of each juror in order to keep the jury selection process efficient and effective.

SUMMARY

The present invention is directed to a jury selection system comprising a generally rectangular board having a first surface, and a second surface opposite the first surface. The board has at least one hinge dividing the board into at least two sections. The first surface comprises a grid having demarcated spaces of equal, dimensions, and, optionally, a blank region in between the grid and the top edge. The demarcated spaces of the grid mimic the jury seats and the prospective alternate juror seats. The system further comprises primary and supplemental tags for the user to write notes on and attach to the board, and peremptory tags to keep track of peremptory challenges made by the attorneys, which also cm be attached to the board.

BRIEF DESCRIPTION OF DRAWINGS

FIG. 5 is a top view of an embodiment of a primary tag.

FIG. 6 is a top view of an embodiment of a supplemental tag.

FIG. 7 is a top view of an embodiment of a peremptory tag.

DETAILED DESCRIPTION OF THE INVENTION

The detailed description set forth below m connection with the appended drawings is intended as a description of presently-preferred embodiments of the invention and is not intended to represent the only forms in which the present invention may be constructed or . utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
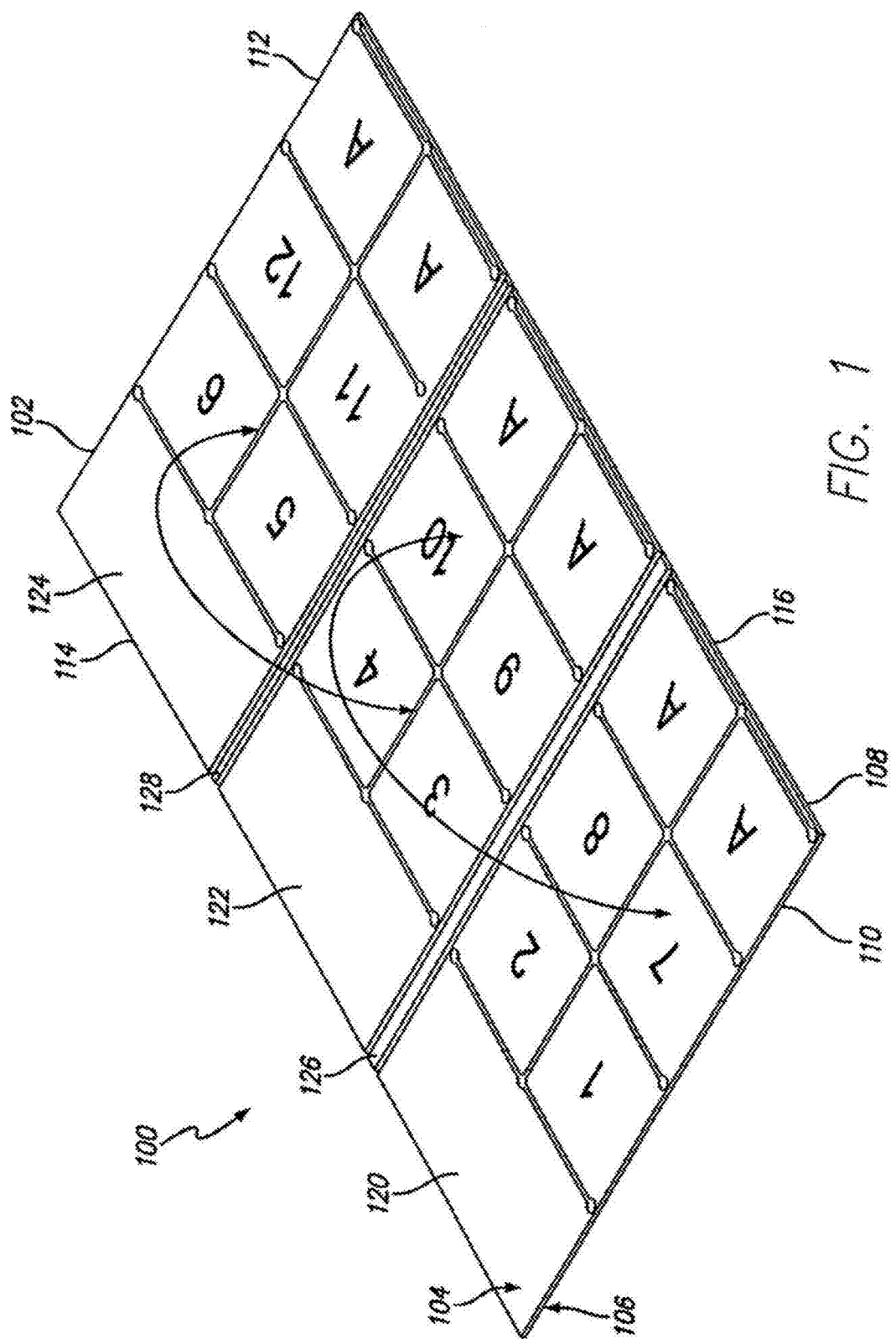
FIG. 1 shows a perspective view of an embodiment of the jury selection system.
Figure 2:
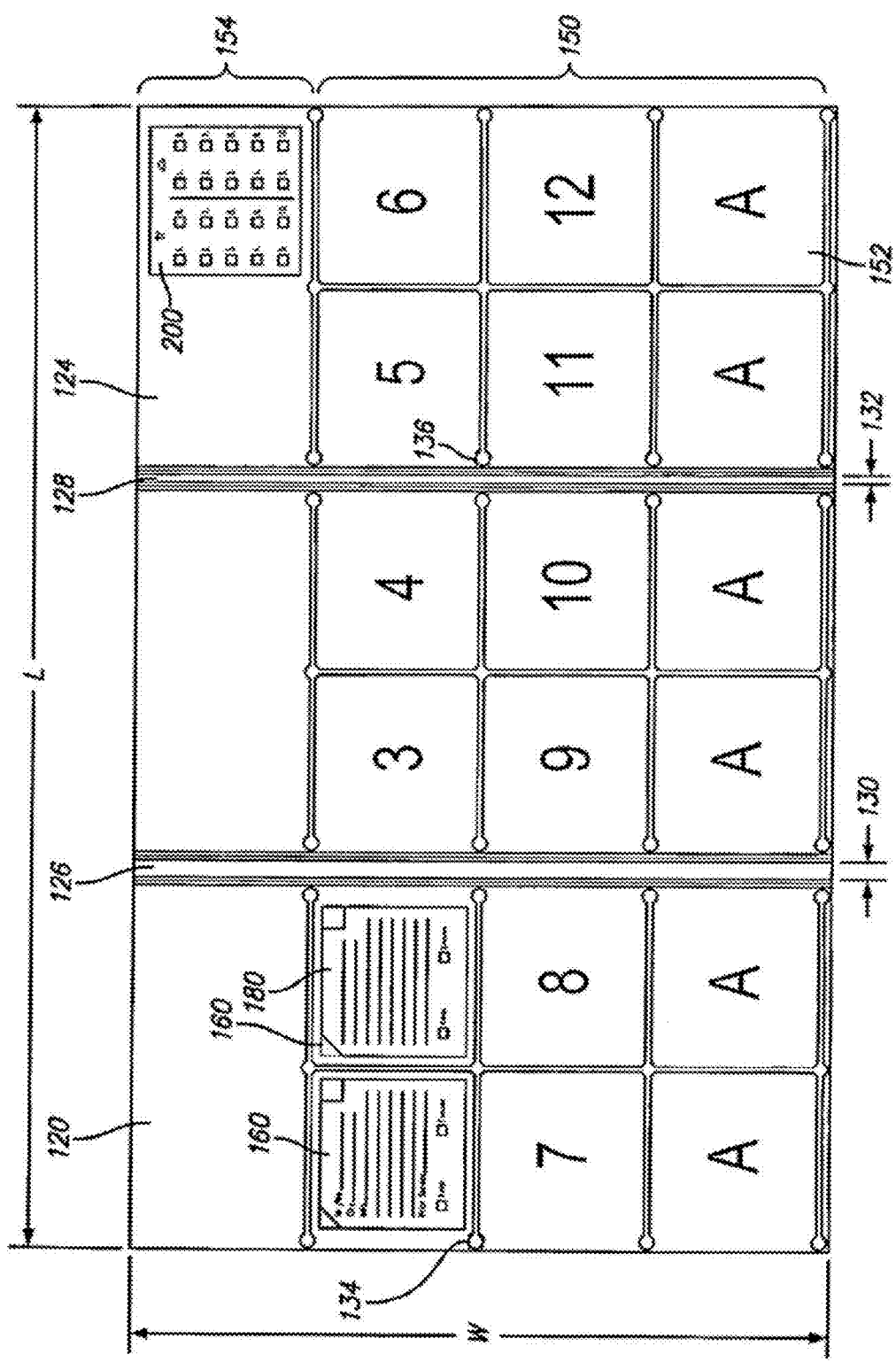
FIG. 2 shows a top view of the embodiment shown in FIG. 1 in use with the primary, supplemental, and peremptory tags.

The present invention is directed towards a jury selection system 100 designed to facilitate the jury selection process for a trial. As shown in FIGS. 1 and 2, the jury selection system 188 comprises a hoard 102 having a first surface 184 and a second surface 106 opposite the first surface 104, the first and second surfaces 104, 106 defined by a perimeter edge 108. In the preferred embodiment, the board 102 is generally rectangular in shape. Therefore, in the preferred embodiment, the perimeter edge 108 composes a left edge 110, a right edge 112 opposite and parallel to the left edge 110, a top edge adjacent and perpendicular to the left and right edges 110, 112, a bottom edge 116 opposite and parallel to the top edge 114, the bottom edge 116 adjacent and perpendicular to the left and right edges 110, 112. A first distance measured from the left edge 110 to the right edge 112 defines an overall length L of the hoard 102, and a second distance measured from the top edge 114 to the bottom edge 116 defines an overall width W of the board.

The overall length L of the board 102 may be from approximately 18 inches to approximately 35 inches. In the preferred embodiment, the overall length L of the board is approximately 24 inches to approximately 33 inches. The overall width W of the board 102 may be from 10 inches to approximate 25 inches. In the preferred embodiment, the overall width W is approximately 15 inches to approximately 19 inches. The board 102 can be made from any type of supportive material, such as cardboard, plastic, metal, wood, glass, and the like. For example, the board 102 may be made from the same material used for a dry erase board or whiteboard.

In some embodiments, the board 102 may have a cover 118 encasing the board 102. The cover 118 provides an aesthetic quality as well as providing a comfortable surface to work on. The cover 118 can be made of material such as leather, vinyl, plastic, fabric, nylon, and the like. Depending on the material used for the board 102, the cover 118 may only encase a portion of the board 102. For example, if the board 102 was a dry erase board, then the first surface 104 having the dry erase board properties would not be covered; but the second surface 106 providing support could be covered, as well as the edges 110, 112, 114, 116.

In the preferred embodiment, the board 102 may be divided into two or three sections so that the board 102 can be folded into a smaller unit. In some embodiments, the board 102 may be divided into more than three sections so as to create even a smaller unit for easier transportation in a briefcase, satchel, side bag, and the like.

In the two section embodiment, the board 102 may be split approximately in half into a first section 120 and a second section 122, The first and second sections 120, 122 may be, for example, a left section and a right section, respectively, or a top section and a bottom section, respectively. Preferably, the first and second sections 120, 122 are substantially identical in shape and size. The first and second sections 120, 122 are connected together by a hinge 126. In the preferred embodiment, the first and second sections 120, 122 are connected together by a living hinge. This eliminates any gap between the first and second sections 120, 122 while still allowing the first and second sections 120, .122 to fold on top of each other.

In the three section embodiment, the board 102 may be split into three substantially equal sections, a first, section 120, a second section 122 connected to the first section 120, and a third section 124 connected to second section 122 opposite the first section 120. In the preferred embodiment, a first hinge 120 Is located approximately one-third of the overall length L from the left edge 110 to the right edge 112 to connect the first section 120 to the second section 122. A second hinge 128 is located approximately two-thirds of the overall length L from the left edge 110 to the right edge 112 to connect the second section 122 to the third section 126. In the preferred embodiment, the hinges 126, 128 are living hinges.

Figure 3:
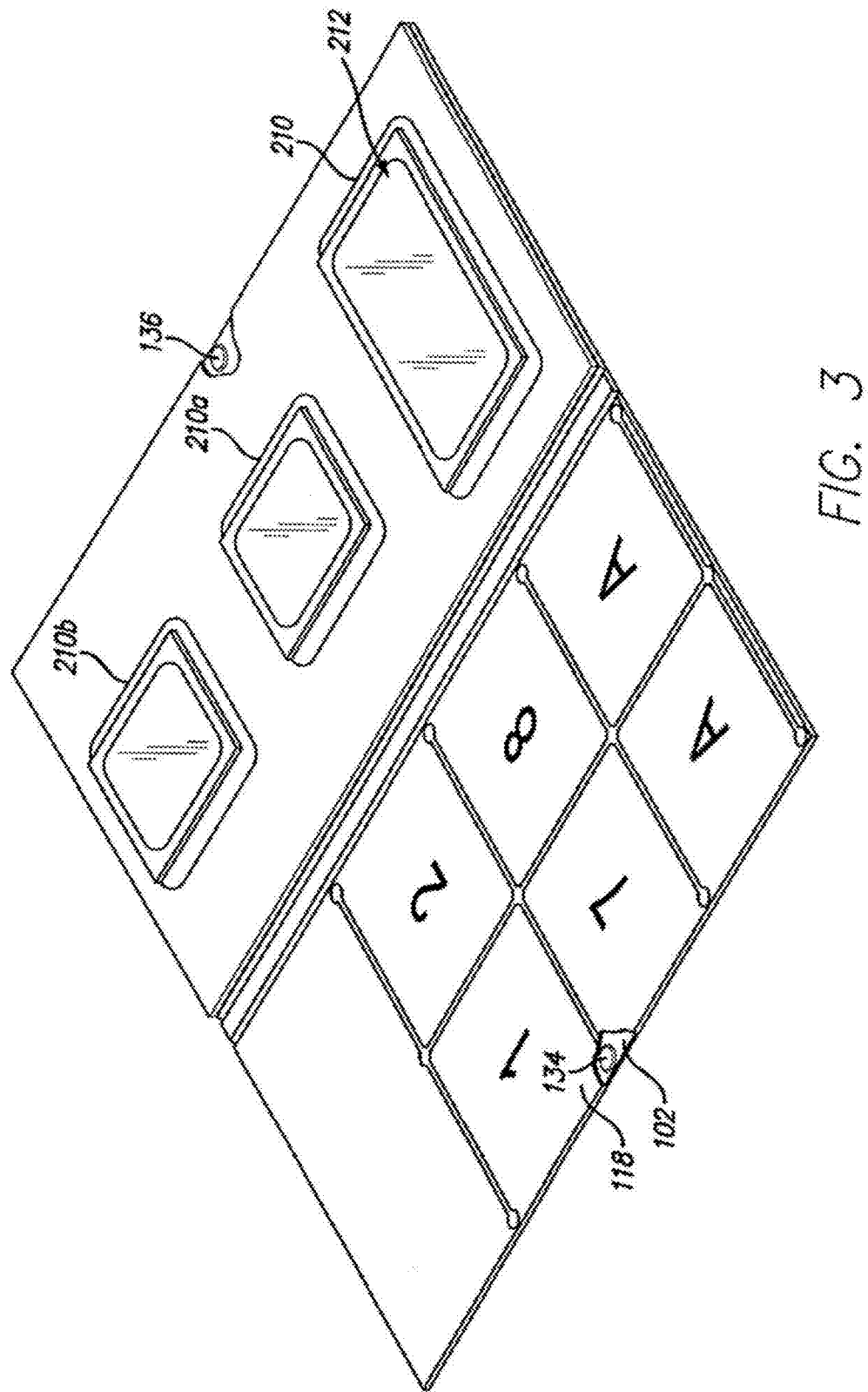
FIG. 3 shows a perspective view of the embodiment shown in FIG. 1 in the partially closed configuration with partial cutaway portions to show the cover and closure mechanism.
Figure 4:
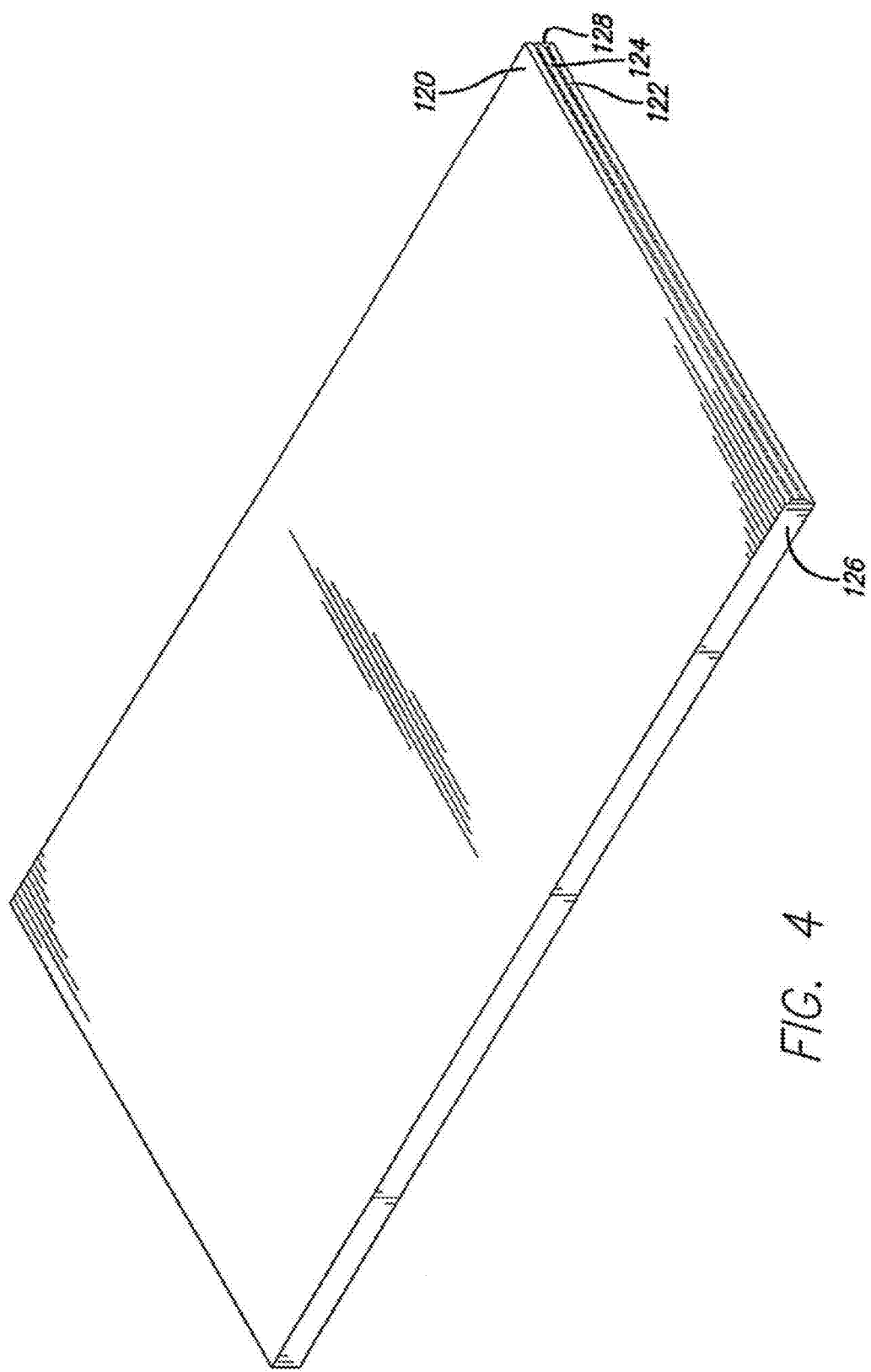
FIG. 4 shows a perspective view of the embodiment shown in FIG. 1 in the closed configuration.
Figure 9:
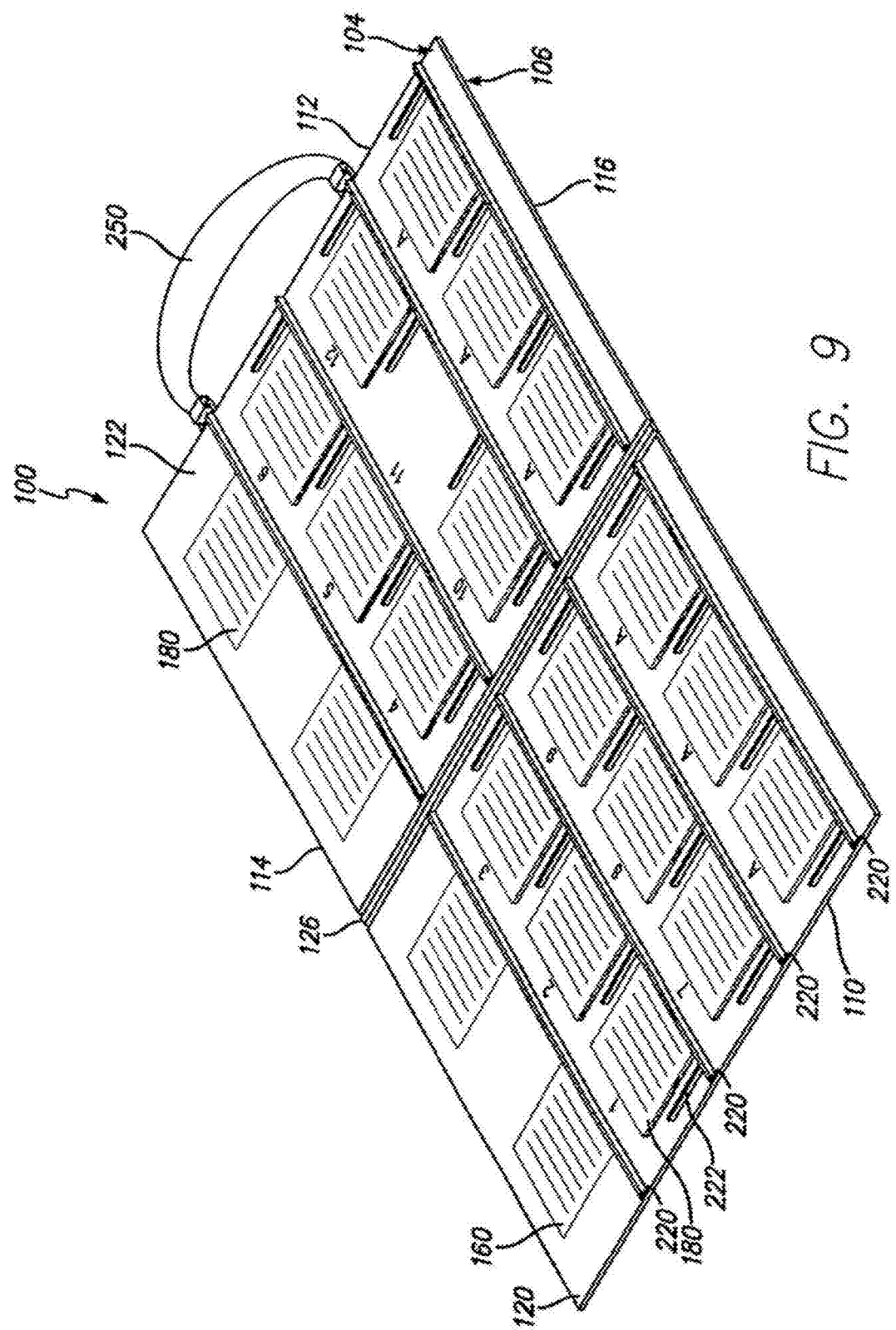
FIG. 9 is a perspective view of another embodiment of the board.

The living hinge may be created by a thinned out portion of the board 102 located, in between any two sections. Preferably, the living hinge is created by the cover 118. Each section may be a separate and independent piece. The cover 118 is configured to encase all sections in a flat, linear arrangement with a gap in between each section. The portion of the cover 118 overlaying the gap can be sealed together to create the living hinge extending from, the top edge 114 to the bottom edge 116. This also isolates one section from another section. In the two section embodiment, a single living hinge 126 is created between the first and second sections 120, 122. The width of the living hinge 130 is sufficient enough to allow the first section 120 to fold completely on top of the second section 122 to reduce the overall length to approximately one-half, thereby creating a bifold notebook as shown in FIG. 9. In the three section embodiment, two living hinges 126, 128 are created extending from the bottom edge 116 to the top edge 114, one between the first section 120 and tire second section 122, and one between the second section 122 and the third section 124. In the preferred embodiment, as shown by the arrows in FIG. 1, the third section 124 is configured to fold on top of the second section 122, and the first section 120 is configured to fold on top of the third section 124 once the third section is folded on top of the second section, thereby creating a trifold notebook as shown in FIGS. 3 and 4. This reduces the overall length of the notebook or case by approximately one-third. In order for the first section 120 to stack on top of the two other sections 122, 124, the gap between the first and second sections 120, 122 should be larger than the gap between the second and third sections 122, 124. In other words, the width of the first living hinge 130 is greater than the width of the second living hinge 132. This arrangement can be reversed with the first section 120 folding on top of the second section 122 first, then having the third section 124 fold on top of the first section 120.

The jury selection system 100 may further comprise a closure mechanism to keep the board 102 in its folded configuration. Any closure mechanisms can be used, such as magnets, hook and loop fasteners, clasps, bands, ties, clips, hooks, buttons, adhesives, spring-loaded hinges, and the like. FIG. 3 shows the jury selection system 100 in a partially closed configuration with portions of the cover 118 removed to show a magnetic closure system embedded in the board 102. In the preferred embodiment, the closure mechanism comprises a first magnetic material 134 positioned adjacent to the left edge 110 on the first surface 104, and a second magnetic material 136 positioned adjacent to the second hinge 128 on the second surface 106 in the third section 124, such that when the third section 124 is folded along the second hinge 128 onto the second section 122, and the first section 120 is folded along the first hinge 126 onto the third section 124, the first magnetic material 134 and the second magnetic material 136 are aligned to connect with each other. This arrangement can be reversed if the first section 120 is to be folded on top of the second section 122 and the third section 124 folded on top of the first section 120. In some embodiments, the surfaces receiving the magnetic material may each have a recess substantially the same size as their respective magnet to house the magnet so that the magnets do not protrude significantly beyond the surface into which they have been embedded so that the board can maintain as flat of a configuration as possible when folded.

The top surface 104 of the board (or cover) comprises a grid 150. The grid 150 may be created by lines drawn, labeled, painted, printed, and the like, on the top surface 104 as shown, in FIGS. 1 and 2 or barricades rising up from the top surface 104 as shown in FIG. 9. The grid 150 may have demarcated spaces 352, each space 152 preferably having equal dimensions, in between, fee grid 150 and the top edge 114 of the board 102 may be a blank region 154, The blank region 154 is referred to as the voir dire ledge. Preferably, a width of the blank region (as measured from the top of the grid 150 to the top edge 114 of the board 102) is at least equal to a width of one of the demarcated spaces 132. In the preferred embodiment, the grid 150 comprises three rows and six columns defining eighteen demarcated spaces 152 having equal dimensions. This arrangement mimics the seating arrangement of an actual jury box for a twelve-member jury with six prospective alternates. Therefore, the grid 150 may be referred to as the jury box and each demarcated space 152 may be referred to as a juror's seat. As such, the demarcated spaces 152 in the first row of the grid may be numbered 1 through 6 to correspond with the seat number of the first six jurors. The next six demarcated spaces 152 in the second row may be numbered 7 through 12. The last six demarcated spaces 152 in the third row may be labeled with A's, or A-1, A-2, A-3, etc. In some embodiments, the demarcated spaces 152 may be left blank, to allow the user to fill in the seat numbers according to the arrangement indicated by the judge. This can be done using a permanent or nonpermanent marker or pen. In such embodiments, the top surface 104 may be made of material so that the seat numbering can be erased.

Figure 8:
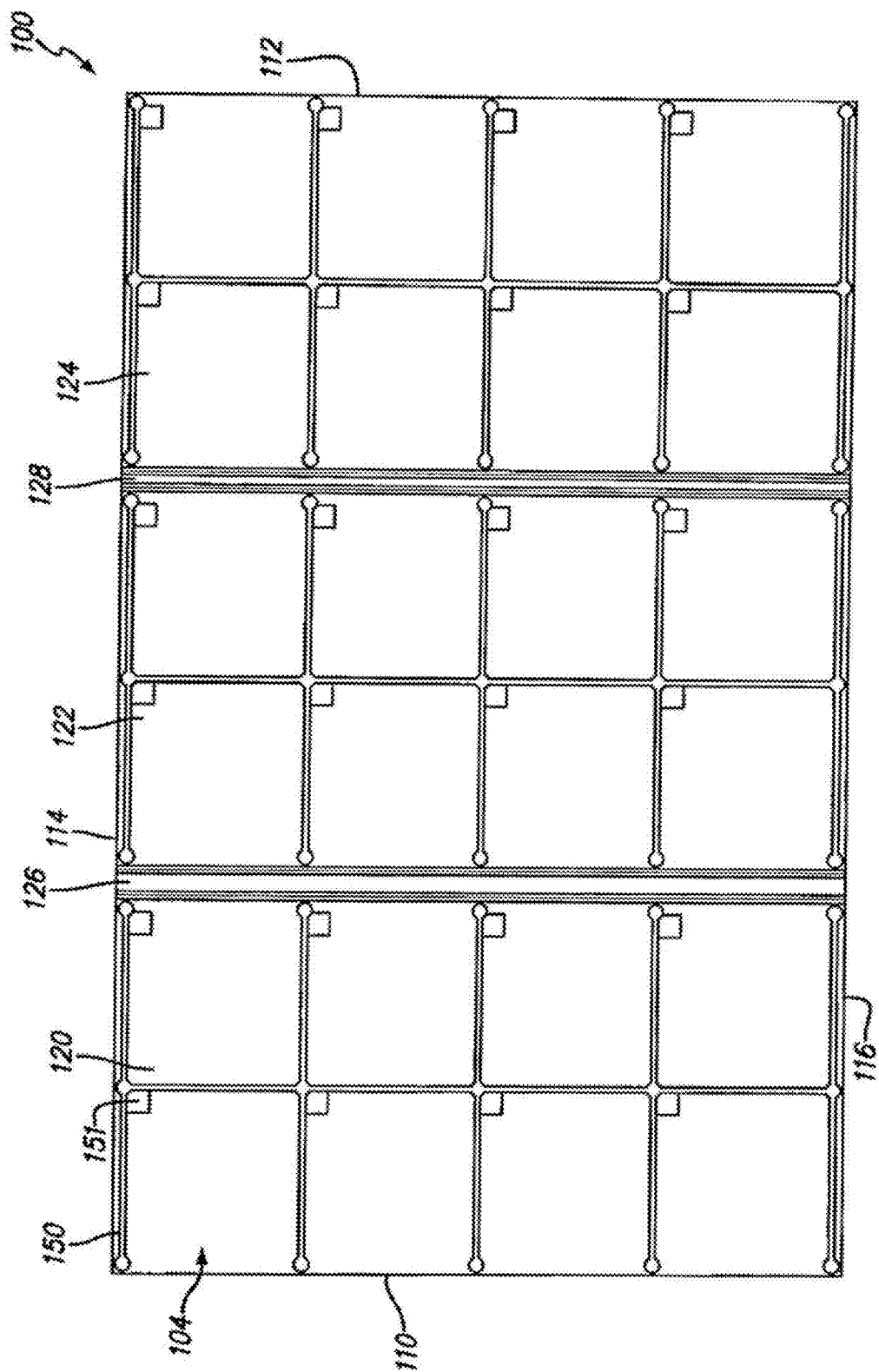
FIG. 8 is a top view of another embodiment of the board.

In some embodiments, in order to improve the versatility of the jury selection, system 100, rather than having a six column by three row grid 150, as shown in FIG. 8, the grid 150 may be six columns by four rows with the fourth row occupying, the blank region 154. In addition, each space 152 defined by the grid may have a seat indicator box 151 for the user to input the juror's seat number. The entire board 102, or just the seat indicator box 151, can be made of the same material used for dry erase hoards or whiteboards, or some other material that can be marked on and then erased. This creates a universal grid that can be adapted to any jury seating arrangement For example, in some instances, there may be more than six alternate jurors. In addition, in some courts, judges use a "snake" system whereby juror number 7 sits directly in front of juror number 6 instead of juror number 1. By leaving the spaces 152 blank, the user is able to insert the juror's seat number according to the judge's arrangement. If twelve jurors and six alternates are used, the top row can still be used as the voir dire ledge. If all spaces are used for the prospective jurors and alternates, then the table upon which the jury selection system 100 is placed can be used for voir dire. Alternatively, the board 102 can be made slightly larger and accommodate a grid 150 having six columns and four rows, with the blank region 154 still existing between the top of the grid and the top edge 114 of the board 102.

In another embodiment, as shown in FIG. 9, each row may be separated by a ledge 220. Therefore, the board 102 may comprise four ledges 220 spanning across the length L of the board 102, the first ledge separating the blank region 154 from the first six demarcated spaces, the second ledge separating the first six demarcated spaces from the next six demarcated spaces, the third ledge separating the second six demarcated, spaces from the third six demarcated spaces, and the fourth ledge separating the third six demarcated spaces from the bottom edge. In the bifold or trifold embodiment, each ledge 220 described above can be split into two or three ledges, respectively, to allow the jury board to fold without obstruction from the ledges. The ledges 220 are attached to the board at their bottom edges. Therefore, the top edge of each ledge is open so that a tag 160, 180 can be slipped is between the ledge 220 and the board 102. In some embodiments, the ledge 220 creates a biasing force against the board so as to clip the tags 160, 180 against the board 102. In some embodiments, the grid 150 may be created by rectangular or square-shaped barricades 222 projecting outwardly from the top surface 104 to separate one demarcated space from another demarcated space so that tags 160, 180 from one demarcated space do not overlap with tags from another demarcated space.

Figures 5, 6, 7:
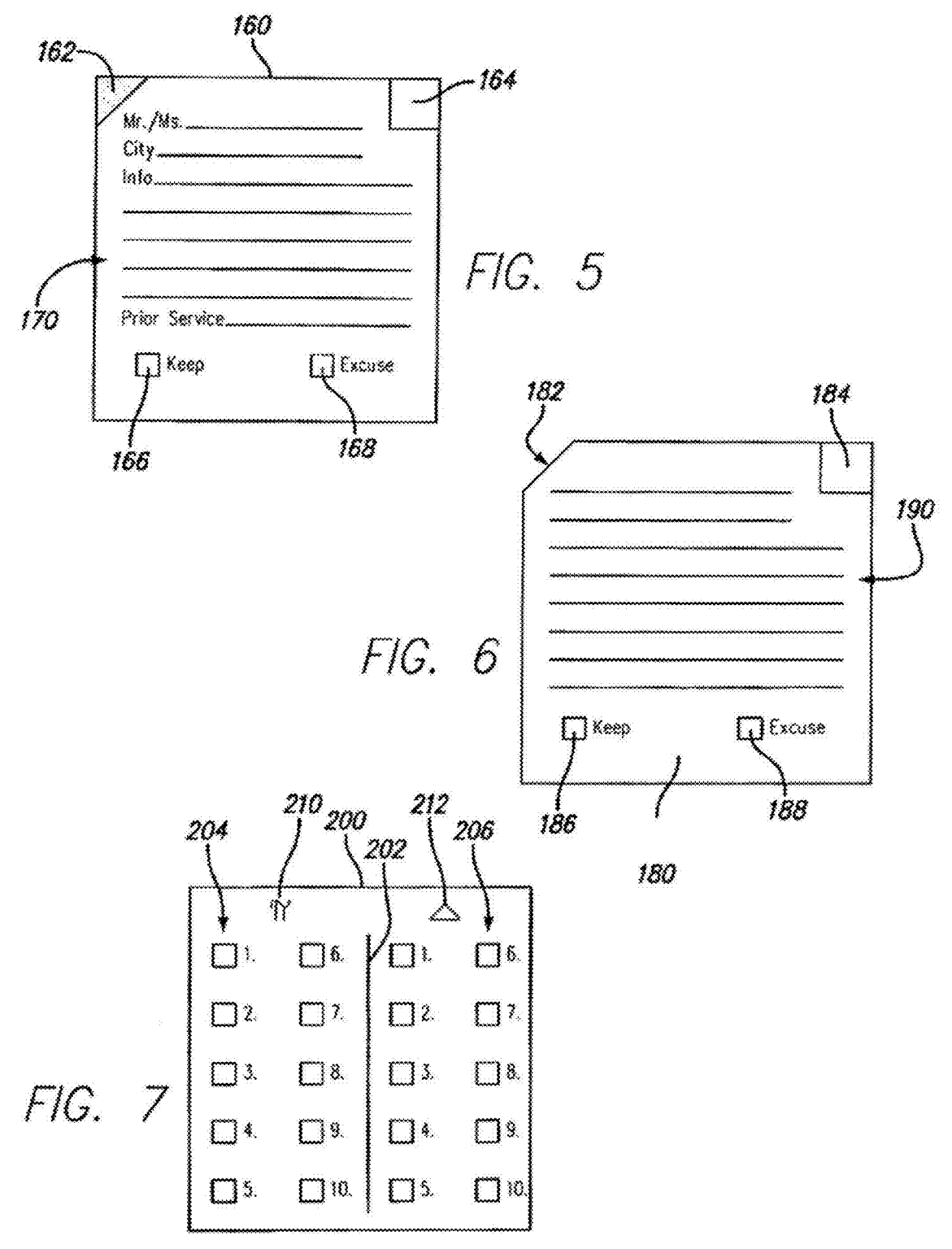

The jury selection system 100 further comprises a set of primary tags 160, comprising a plurality of individual primary tags. Bach individual primary tag may be reversibly attachable to the board 102. Bach individual primary tag 160 comprising a front side and a back side opposite the front side, the front and back sides bound, by at least one of edge. In the preferred embodiment, as shown in FIG. 5, the primary tag 160 is rectangular or square in shape having four edges. The front side of the primary tag may have a primary tag indicator 162. In the preferred, embodiment, the primary tag indicator 162 is a marking in the upper left-hand corner of the primary tag 160. For example, the marking may be a red triangle with two legs of the triangle being defined by a small portion of where two adjacent edges of the primary tag meet. In the upper right-hand corner of the primary tag 160, there may be a seat demarcation 164 for the user to indicate the juror's seat number. At the bottom of the primary tag 160 are two checkboxes 166, 168 for the user to indicate whether they will keep this juror or excuse the juror. Throughout the remainder of the primary tag 160 there may be general information section 170, such as a blank space, lined portions, or prompts indicating where specific or general information can be written down, such as name, city, prior service, and any other information received from the juror in response to an inquiry or instruction.

In some embodiments, the back side of the primary tag 160 comprises a connector (not shown), in the preferred embodiment, the connector is an adhesive, and in particular, a low-tack adhesive that can be adhered, removed and adhered again to the board 102 or cover 118. The adhesive may cover only the top portion of the primary tag 160.

The jury selection system 100 may further comprise a set of supplemental tags 180 containing a plurality of individual supplemental tags. Each individual supplemental tag is reversible attachable to at least one of (he primary tags 100 or the board 102 or cover 118. As shown in FIG. 6, each individual supplemental tag 180 is dimensioned similarly to each individual primary tag 160. Therefore, each individual supplemental tag 180 also comprises a front side and a back side opposite the front side, the front and back sides being bound by at least one of edge. In addition, the supplemental tag 180 further comprises a cutout 182. The cutout 182 is positioned on the individual supplemental tag 180 such that when the supplemental tag 180 is placed on top of the primary tag 160 with their respective edges aligned, the cutout 182 aligns with the primary tag indicator 162, thereby leaving the primary fag indicator 162 exposed. This allows the user to always know where to go to find the primary tag 160, which may have the most critical information. Therefore, in the preferred embodiment, the cutout 182 is located in the upper left-hand corner. The supplemental tag 180 may also have a seat, demarcation 184 on the upper right-hand corner for the juror's seat number. The bottom of the supplemental tag may also have checkboxes 204, 206 for the user to indicate whether or not to keep or excuse the juror. The remainder of the supplemental tag 180 may be blank or have lines for the user to write down additional information.

The jury selection system 100 may further comprise a set of peremptory tags 200 containing a plurality of individual peremptory tags. Each individual peremptory tag 200 may be reversibly attachable to the board 102 or cover 118. As shown in FIG. 7, each individual peremptory tag 200 may be dimensioned similarly to each individual primary tag 160. Therefore, each individual peremptory tag 200 also comprises a front side and a back side opposite the front side, the front and back sides being bound by at least one of edge. The peremptory tag 200 may have a midline 202 splitting the peremptory tag 200 in half, each half containing a plurality of check boxes 204, 206, for example, ten checkboxes in each half. Each checkbox 204, 206 is associated with a number to keep track of the number of peremptory challenges made by each party. One half may be labeled with a plaintiff indicator and the other half may be labeled with a defendant indicator. Like the primary and supplemental tags 160, 180, the peremptory tag 200 may comprise an adhesive on the back side to reversibly adhere to the hoard or cover. In some embodiments, the peremptory tag 200 may be plastic or have a glossy surface for use with a nonpermanent marker. In some embodiments, the peremptory tag 200 may be a part of the board 102, for example, a portion of the board 102 may have a glossy surface labeled as described above so that peremptory challenges can be kept track of using a nonpermanent marker directly on the board 102.

As shown in FIG. 3, the jury selection system 100 may further comprise at least one holder 210. The holder 210 can he used to hold such things as business cards, primary tags 160, supplemental tags 180, peremptory tags 200, and the like. In some embodiments, the jury selection system 100 may comprise a plurality of holders 210, 210a, 210b. In the preferred embodiment, the holder 210 is in the form of a pocket stitched to the back surface of the board or cover. The holder may have a see-through window 212.

In some embodiments, the jury selection system 100 may have a handle 250 attached to the board 102 for easy carrying when in the closed configuration.

By way of example only, in the preferred embodiment, the board 102 is approximately 24 inches in length and approximately 15 inches in width. The board 102 comprises three sections 120, 122, 124, each section being approximately 7.6 inches in length and approximately 15 inches in width. The gap between the first section 120 and the adjacent, second section 122 is approximately 0.7 inch. The gap between the second section 122 and the adjacent third section 124 is approximately 0.4 inch. The board 120 is covered with a leather covering 118, the leather covering 118 creating a first living hinge 126 between the first and second sections 120, 122, and a second living hinge 128 between the second section 122 and the third section 124. On the top surface 104 adjacent to the left edge 110 on the first section 120, approximately midway between the top edge 114 and the bottom edge 116 is a half-inch circular magnet 134 house in a circular recess on the top surface 104. On the bottom surface adjacent 106 to the second living hinge 128, approximately midway between the top edge 114 and the bottom edge 116, is a half inch circular magnet 136 housed in a circular recess on the bottom surface 106. On the top surface 104, a six column by three row grid 150 is printed on the cover 118 with a blank region 154 between the top of the grid 150 and the top edge 114 of the board 102 for the voir dire ledge. The region 154 between the top of the grid 150 and the top edge 114 is approximately 4 inches. Each space 152 of the grid 150 is approximately 3.6 inches by 3.6 inches. The gap between the first section 120 and the second section 122 is approximately 0.7 inch, and the gap between the second section 122 and the third section 124 is approximately 0.4 inch. The thickness of the hoard 102 is approximately 0.4 inch. On the back of the third section 124 is the holder 210 to hold business cards.

The primary tag 160 is a square having dimensions of approximately 3 inches by 3 inches. In the upper left-hand corner is a red triangular shaped primary tag indicator 162. Each supplemental tag 180 is a square having dimensions of approximately 3 inches by 3 inches. In the upper left-hand corner is a diagonal cutout 182 to expose the red, triangle shaped primary tag indicator 162 when the supplemental tag 180 is placed on top of the primary tag 160 with their respective edges aligned.

To use the jury selection system 100, before the court clerk calls up the jury panel, the primary tags 160 may be positioned in the demarcated spaces 152. A peremptory tag 200 may be placed in the upper right hand corner of the board. When the court clerk calls up the panel to take their seats, the jurors' names' can be written down on the top line and the seat number recorded in the seat demarcation 164 in the upper right corner of the primary tag 160. The primary tag 160 may be placed in the marked spaces 152 having the number corresponding to the juror's number, if this has not already been done. For alternates, the seat demarcation 164 is left blank and the primary tag 160 is placed in the alternate's section according to where the alternate sits, if this has not already been done. This step can be repeated until all prospective jurors are seated.

When the prospective juror provides his personal information such as city of residence, marital status, occupation, education, and prior jury service, the information can be recorded on the primary tag 160. If more space is needed, or if the prospective juror is questioned, the supplemental tag 180 can be used to record additional information, that did not fit on the primary tag 160. The supplemental tag 180 may be placed on top of the primary tag 160 on the board 102 in such a way as to expose the indicator 162 in the upper left-hand corner so as to identify the primary tag 160. Optionally, the supplemental tag 180 can be given to any jury consultants, insurance company adjusters, associate attorneys, paralegals, and/or clients so they can offer comments and questions. The appropriate seat number in the jury seat demarcation 184 should be marked so that the supplemental tag 180 can be placed in the appropriate jury box 152 on the board 102.

If a prospective juror is to be questioned during voir dire, all tags 160, 180 for the juror in question can be spread out on the voir dire ledge 154 above the grid 150. This allows the attorney to see quickly, at a glance, information pertaining to the juror as he begins the voir dire process for the juror. When questioning is complete, all of the tags 160, 180 may be placed back on the jury board 102 in the appropriate jury box 152. Once a decision has been made regarding whether to keep or excuse a prospective juror, the appropriate box on the tag is checked off.

When a juror has been excused for cause or through challenge, the juror's tags 160, 180 are removed from the hoard 102 and replaced with the primary tag 160 of the first alternate. The seat number is recorded in the seat demarcation 164 on the alternate's primary tag 160. If a challenge was made to remove the juror, this is recorded on the peremptory tag 200. This process can be followed until the jury is seated and sworn in. Once completed, the jury selection system 100 can be folded up and the tags saved in the event of judicial error or to speak with the jury after the trial is over.

In some embodiments, rather than using adhesives to attach the primary and supplemental tags 160, 180 to the top surface, the primary and supplemental tags 160, 180 can be bound to the hoard with ledges that function like clips.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A method for selecting a jury, comprising:
   a. laying open a jury selection system, the jury selection system comprising:
      i. a board, comprising a grid having at least three rows and six columns defining at least eighteen demarcated spaces, each demarcated space having equal dimensions;
      ii. a set of primary tags, comprising a plurality of individual primary tags, each individual primary tag being reversibly attachable to the board, each individual primary tag comprising a front side and a back side opposite the front side, the front and back sides bound by a plurality of edges, the front side comprising a primary tag indicator and the back side comprising a connector; and
      iii. a set of supplemental tags, comprising a plurality of individual supplemental tags, each individual supplemental tag reversibly attachable to the board, each individual supplemental tag dimensioned similarly to the individual primary tag, each individual supplemental tag comprising a front side, a back side opposite the front side, and a cutout, the front and back sides bound by a plurality of edges, the cutout being positioned on the individual supplemental tag such that when the individual supplemental tag is placed on top of the individual primary tag with their respective plurality of edges aligned, the cutout aligns with the primary tag indicator, thereby leaving the primary tag indicator exposed;
b. placing one primary tag in each of the demarcated spaces;
c. recording a seat number of each prospective juror on the respective primary tag in accordance with a seating arrangement of each prospective juror relative to each other;
d. leaving a seat number of each alternate juror blank;
e. recording prospective juror information on the primary tag of a corresponding prospective juror; and
f. if more space is needed, recording additional information on the supplemental tag and placing the supplemental tag on top of the primary tag i such a way as to expose the primary tag indicator.

2. The method of claim 1, wherein during a voir dire process, the method comprises spreading out the primary tag and supplemental tag for the corresponding prospective juror in question along a blank region in between the grid and a top edge of the board, wherein a width of the blank region is at least equal to a width of one of the demarcated spaces.

3. The method of claim 2, wherein when the corresponding prospective juror is excused;
a. removing the corresponding primary tag and supplemental tag from the board;
b. placing an alternate juror's primary tag into the demarcated space vacated by the excused juror's primary and supplemental tags; and
c. recording the corresponding seat number on the alternate juror's primary tag.

\* \* \* \* \*